(12) United States Patent
Howell et al.

(10) Patent No.: US 6,618,471 B1
(45) Date of Patent: Sep. 9, 2003

(54) METHOD AND SYSTEM FOR MEASURING USAGE OF ADVANCED INTELLIGENT NETWORK SERVICES

(75) Inventors: Robert B. Howell, Superior, CO (US); Donald E. Gillespie, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/164,763

(22) Filed: Oct. 1, 1998

(51) Int. Cl.⁷ .............................................. H04M 15/00
(52) U.S. Cl. .............................. 379/114.28; 379/112.01; 379/221.08; 379/221.09
(58) Field of Search ........................ 379/133, 114.28, 379/114.29, 126, 127.01, 221.08, 221.09, 112.01, 230, 201.01, 115.01, 111, 114.01, 114.05, 115.02; 455/461; 370/352

(56) References Cited

U.S. PATENT DOCUMENTS

| | | | |
|---|---|---|---|
| 4,873,517 A | * 10/1989 | Baratz et al. ................ 370/236 |
| 5,425,090 A | 6/1995 | Orriss | |
| 5,479,495 A | 12/1995 | Blumhardt | |
| 5,526,413 A | 6/1996 | Cheston, III et al. | |
| 5,570,410 A | * 10/1996 | Hooshiari ................ 379/32.03 |
| 5,572,583 A | 11/1996 | Wheeler, Jr. et al. | |
| 5,581,610 A | * 12/1996 | Hooshiari | |
| 5,771,279 A | 6/1998 | Cheston, III et al. | |
| 5,802,146 A | * 9/1998 | Dulman ................... 379/32.03 |
| 6,003,090 A | * 12/1999 | Puranik et al. | |
| 6,226,374 B1 | * 5/2001 | Howell et al. .......... 379/221.08 |
| 6,272,110 B1 | * 8/2001 | Tunnicliffe et al. | |
| 6,298,123 B1 | * 10/2001 | Nolting et al. .............. 379/111 |
| 6,516,348 B1 | * 2/2003 | MacFarlane et al. ........ 709/224 |

* cited by examiner

Primary Examiner—Huyen Le
Assistant Examiner—Barry W Taylor
(74) Attorney, Agent, or Firm—Brooks & Kushman P.C.

(57) ABSTRACT

A method and system for measuring the usage of advanced intelligent network (AIN) resources includes providing a call processing record (CPR) logic diagram for a service control point (SCP) in an AIN to follow for providing an AIN service for a call. The CPR logic diagram includes separate paths having functions to be performed by the SCP during the call. The processing times required by the SCP for performing the functions associated with the paths of the CPR logic diagram is then estimated. The estimated processing times are then associated with respective paths of the CPR logic diagram. The SCP is then monitored to determine which path the SCP follows during the call. The actual processing time expended by the SCP during the call is then determined as a function of the path followed by the SCP for the call.

14 Claims, 3 Drawing Sheets

METHOD AND SYSTEM FOR MEASURING USAGE OF ADVANCED INTELLIGENT NETWORK SERVICES

TECHNICAL FIELD

The present invention relates generally to advanced intelligent networks and, more particularly, to a method and system for measuring usage of advanced intelligent network services.

BACKGROUND ART

Enhanced telephone networks, frequently referred to as advanced intelligent networks (AINs), provide network operators with considerable flexibility and economy in structuring their product offerings and providing their customers with numerous telephone conveniences and services. In an AIN system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message, and forward that message via a common channel interoffice signaling (CCIS) link to a service control point (SCP) which includes a multi-services application platform (MSAP) database.

The SCP is essentially a central control for the network. If needed, it can instruct the central office to obtain and forward additional information. Once sufficient information about the call has reached the SCP, the SCP accesses its stored data tables in the MSAP database to translate the received message data into a call control message and returns the call control message to the office of the network via the CCIS link.

The typical AIN architecture allows the switched transport network to interact with database systems and other so-called intelligent peripherals for obtaining information, data, and support operations. This occurs when the switching network is triggered to access the database or peripheral by some condition that arises when a telephone call is being processed. An AIN trigger typically arises in an AIN equipped switch, and that causes the switch to refer to a database for information or service to support processing of the call.

In recent years, a number of new service features have been provided by AINs such as announcement and digit functions for specific services. For example, a caller may be prompted by a tone or speech announcement to enter a personal identification number (PIN) before obtaining a selected service or modifying stored parameters relating to the subscriber's AIN service. Nodes are usually added to the telephone network, separate from the switching office, to provide the announcements and related enhanced service features. Typical AIN service features include do not disturb, remote access forwarding, automatic call distribution, routing to messaging services, private virtual networking, emergency hot lines, etc.

The Telecommunications Act of 1996 and the subsequent First Order and Report issued by the Federal Conmmunications Commission (FCC) requires that incumbent local exchange carriers (LECs) unbundle their AINs so that competitive local exchange carriers (CLECs) have access to them. CLECs must now be given the opportunity to develop their own AIN services and deploy them in the AIN of the LEC.

By allowing a CLEC access to the AIN of an LEC, a problem now exists in that the LEC must be able to monitor the usage of the AIN services provided by the CLEC without violating the CLEC's confidentiality and intellectual property.

SUMMARY OF THE INVENTION

Accordingly, it is an object of the present invention to provide a method and system for measuring usage of AIN services.

It is another object of the present invention to provide a method and system for measuring usage of AIN services provided by a CLEC in an AIN of an LEC.

It is a further object of the present invention to provide a method and system for validating the measured usage of AIN services provided by a CLEC in an AIN of a LEC.

It is another object of the present invention to provide a method and system for associating the usage of AIN elements by a service provider with the service provider and the type of service.

In carrying out the above objects and other objects, the present invention provides a method for measuring the usage of advanced intelligent network services in an advanced intelligent network including a service control point. The method includes providing a call processing record (CPR) logic diagram for the service control point to follow for providing an advanced intelligent network service for a call. The CPR logic diagram includes separate paths having functions to be performed by the service control point during the call. The processing times required by the service control point for performing the functions associated with the paths of the CPR logic diagram is then estimated. The estimated processing times are then associated with respective paths of the CPR logic diagram. The service control point is then monitored to determine which path the service control point follows during the call. The actual processing time expended by the service control point during the call is then determined as a function of the path followed by the service control point for the call.

The advantages associated with the present invention are numerous. The present invention allows an LEC to measure the usage of AIN services provided by a CLEC. The usage of the AIN services by the CLEC can also be associated with the particular CLEC and the type of service provided.

The above object and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
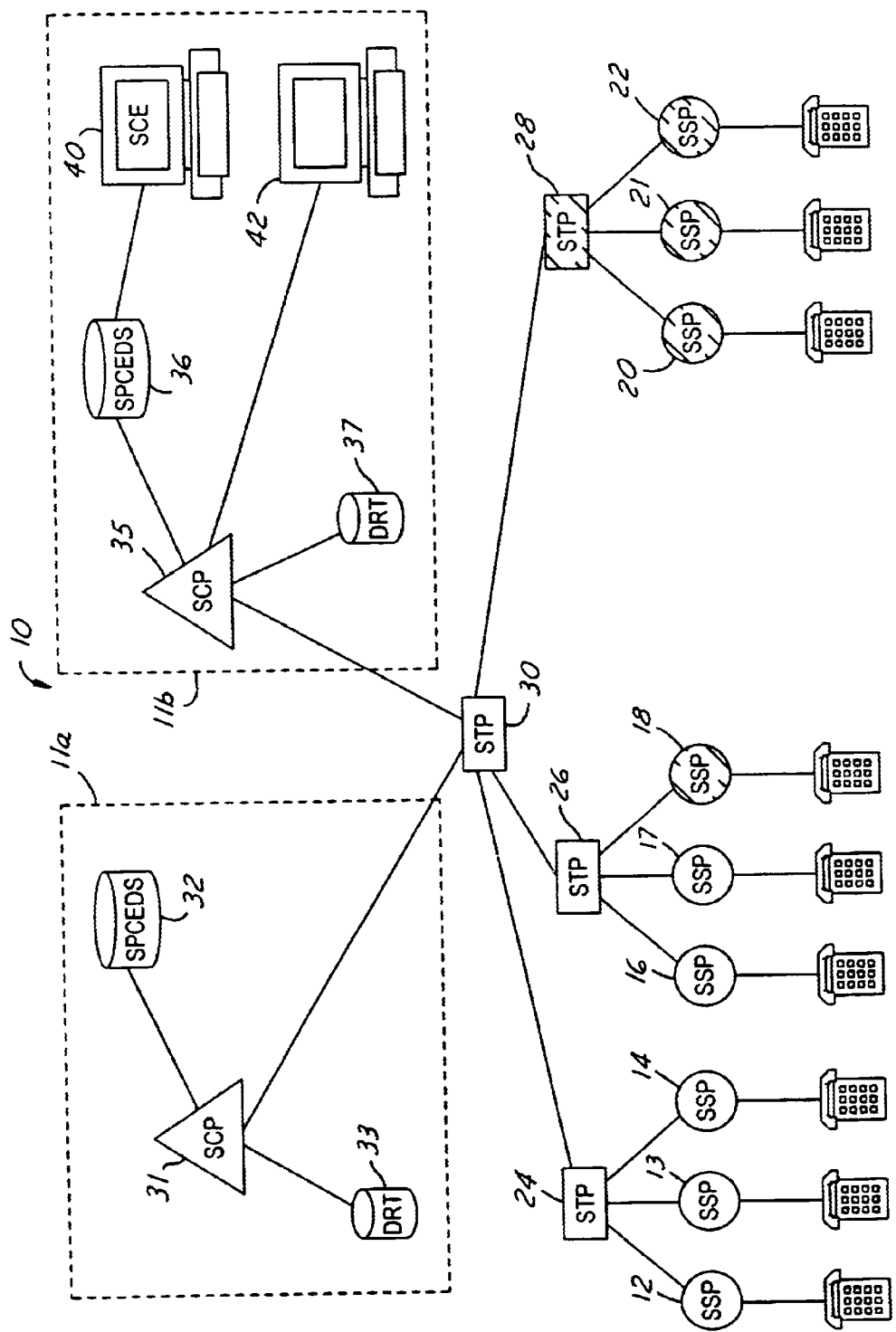
FIG. 1 is a schematic block diagram of advanced intelligent network architecture in a public switched telecommunications network.

Referring now to FIG. 1, an advanced intelligent network (AIN) 10 in accordance with the present invention is shown. AIN 10 includes service switching points (SSPs) 12, 13, 14, 16, 17, 18, 20, 21, and 22. SSPs are appropriately equipped programmable switches present in the telephone network, which recognize AIN type calls, launch queries to SCPs, and receive commands and data from the SCPs to further process the AIN calls.

SSPs 12, 13, and 14 connect to a first local area signal transfer point (STP) 24. SSPs 12, 13, and 14 and STP 24 are operated by a local exchange carrier (LEC). SSPs 16, 17, and 18 connect to a second local area STP 26. SSPs 16 and 17 and STP 26 are operated by the LEC. However, SSP 18 is operated by a competitive local exchange carrier (CLEC). SSPs 20, 21, and 22 connect to a third local area STP 28. SSPs 20, 21, and 22 and STP 28 are operated by the CLEC. The local area STPs 24, 26, and 28 communicate with a regional STP 30 provided by the LEC.

The connection between the SSPs and the STPs are for signaling purposes. Although not shown, the SSPs are interconnected to each other by trunk services for carrying telephone services.

AIN 10 includes both an AIN production environment 11a and a laboratory AIN testing environment 11b. AIN production environment 11a in this example includes a service control point (SCP) 31, a service provisioning and creation environment and data storage (SPCEDS) 32, and a data reporting tool (DRT) 33. AIN testing environment 11b similarly includes SCP 35, SPCEDS 36, and DRT 37. An AIN service developer uses a service creation environment (SCE) computer processing terminal 40 to create and/or modify AIN services. Once an AIN service is tested by AIN testing environment 11b, it can be moved into the AIN production environment 11a where it can undergo integration testing.

Significant departures from typical AINs are shown in FIG. 1. FIG. 1 shows not only the SSPs 12, 13, 14, 16, and 17 and STPs 24, 26, and 30 of the LEC, but also shows the inclusion of SSPs 18, 20, 21, and 22 and STP 20 of the CLEC. In typical AINs, the SSPs and STPs of the CLEC are not provided. The exact details of the specific interconnectivity within a given AIN is not meant to be specified. For instance, no STPs of the CLEC may be provided in the AIN. Further, the hierarchy of the STPs may be different than what is shown.

In AIN 10, the processing of an AIN service starts when a call event on an SSP triggers AIN processing, and a query is launched to an SCP. A service logic record is then activated. In the usage of AIN 10, an LEC may choose to have both the AIN production environment 11a and AIN testing environment 11b as shown in FIG. 1.

The call processing performed by either of SCPs 31 and 35 for providing the AIN services follows a logical flow in which different paths are traversed as a function of subscriber interaction. For instance, a service like "Do Not Disturb" would initially involve a recording being played to a subscriber informing the subscriber that the person being called is unavailable. SCPs 31 and 35 may then request the subscriber to enter an identification code for special access, or instead, leave a message. Thus, two different paths may be taken depending upon the subscriber's choice. Further, if the subscriber enters the identification code for special access, SCPs 31 and 35 may determine if the code is correct and follow different processing paths depending upon the determination.

Each processing path requires different amounts of processing time by SCPs 31 and 35 to perform functions associated with the processing paths. The processing times required by SCP 35 for the different processing paths can be predetermined. Thus, a value for the processing time for each path can be associated with that path from the beginning of the service introduction. Because a CLEC may not use the proper processing times when setting up their AIN service, there may be some disagreement with actual processing times. A feature of the present invention is that AIN testing environment 11b includes an SCP monitor 42 to measure the actual usage of SCP 35 to perform functions. SCP monitor 42 monitors the processing of SCP 35 along given processing paths and then sums the values which have been included in the paths. The total summed value is the amount of processing time expended by SCP 35 for the call. The processing times of SCP 31 must then be related to SCP 35. Preferably, this is a one time calibration test.

Figure 2:
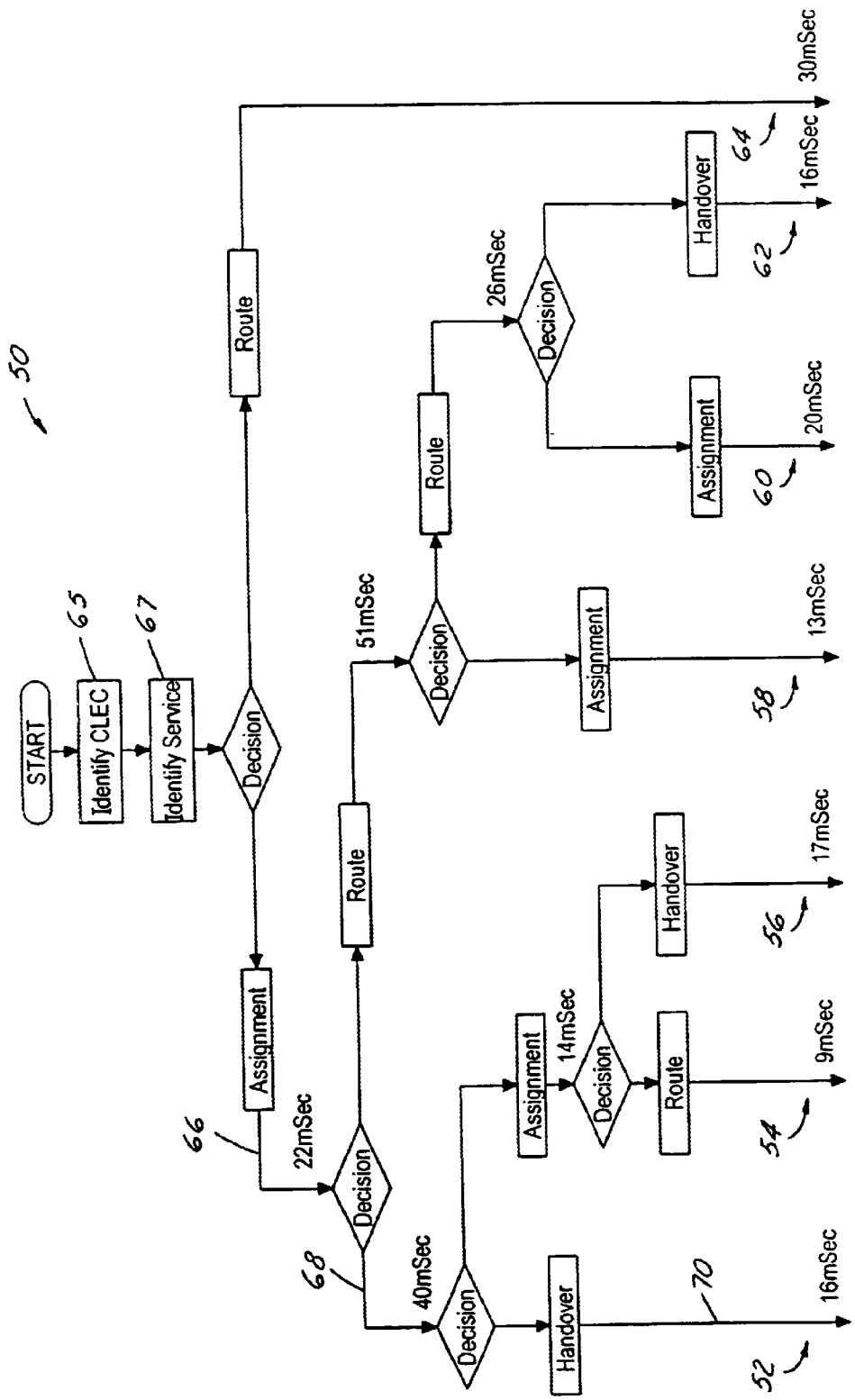
FIG. 2 is a call processing record (CPR) logic diagram for an AIN service.

Referring now to FIG. 2, with continual reference to FIG. 1, a call processing record (CPR) logic diagram 50 is shown. CPR logic diagram 50 includes various processing paths 52, 54, 56, 58, 60, 62, and 64 which SCPs 31 and 35 may follow in processing a call. The paths may include internal handovers between them along given points. For instance, path 52 may jump at a given point over to path 58 at a given point (not specifically shown in FIG. 2). Thus, CPR logic diagram 50 includes real paths such as paths 52, 54, 56, 58, 60, and 62 and virtual paths. The virtual paths take into account internal jumping which may occur between the real paths.

CPR logic diagram 50 is associated with a particular service provider. CPR logic diagram 50 includes assignment boxes 65 and 67 which identify the service provider and the service respectively. CPR logic diagram 50 further includes different boxes which represent functions carried out by SCPs 31 and 35 during the processing of the call. As shown in FIG. 2, the boxes are appropriately labeled with functions such as assignment, decision, route, handover, etc.

Each processing path 52, 54, 56, 58, 60, 62, and 64 includes various branches between the decision boxes. For instance, path 52 includes branches 66, 68, and 70. Each branch includes a function to be performed by SCPs 31 and 35 during the processing of the call. Estimated processing times or central processing unit values (CUVs) required by SCP 31 and 35 for performing the functions are associated with each branch 66, 68, and 70. For example, branches 66, 68, and 70 have associated processing times of 22 mSec, 40 mSec, and 16 mSec, respectively. Path 52 requires the summed total of the processing times which is 78 mSec. Similarly, path 54 requires a summed processing time total of 90 mSec. In AIN testing environment 11b, SCP monitor 42 sums the CUVs as the call proceeds through the selected path to determine the final accumulated CUV total (T) which is indicative of the amount of usage of SCP 35. From these summed values, and actual measured processing times, corrections can be made to the CUVs.

In AIN production environment 11a, SCP 31 inserts the final accumulated and corrected CUV total and inserts it into an automatic message accounting (AMA) billing record. SCP 31 also inserts the CLEC ID and the service ID into the AMA billing record. Thus, for a given call the AMA billing record contains the amount of processing time expended by SCP 31, the identification of the provider of the service, and the identification of the type of service provided.

A key feature of the present invention is that the final accumulated CUV total can be validated to ensure that the estimated processing times are accurate. The validation can be performed using the vmstat utility of UNIX. For example, the vmstat utility provides empirical performance information on running processes.

Figure 3:
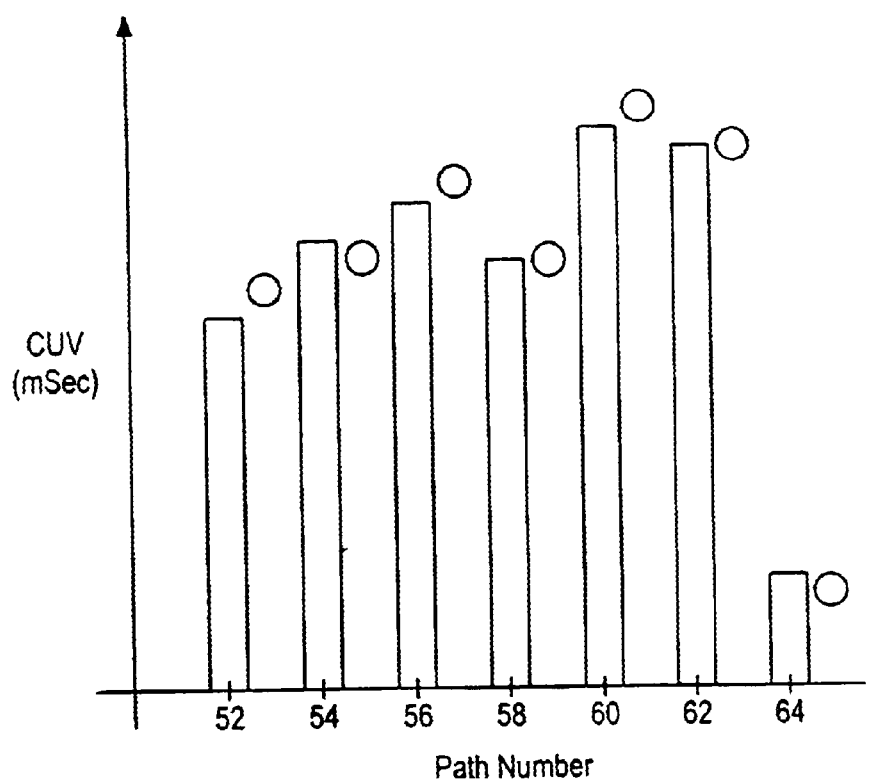
FIG. 3 is a graph illustrating usage of the SCP for different processing paths of the call processing record logic diagram.

As shown in FIG. 3, the bars represent the accumulated processing times (T) for each path number. The circles represent the empirical processing time obtained from a utility such as vmstat. Preferably each branch of CPR logic diagram 50 includes identification. Thus, after summing the total processing time for a particular path, the branch identification can be used to provide detailed information of the number of AIN call units assigned to each branch.

Thus it is apparent that there has been provided, in accordance with the present invention, a method for measuring the usage of advanced intelligent network services in an advanced intelligent network including a service control point that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for measuring the usage of advanced intelligent network services in an advanced intelligent network including a service control point, the method comprising:

providing a call processing record (CPR) logic diagram for the service control point to follow for providing an advanced intelligent network service for a call, the CPR logic diagram including separate paths having functions to be performed by the service control point during the call;

estimating processing times required by the service control point for performing the functions associated with the paths of the CPR logic diagram;

associating the estimated processing times with respective paths of the CPR logic diagram;

monitoring the service control point to determine which path the service control point follows during the call; and determining the actual processing time expended by the service control point during the call as a function of the estimated processing time for the path followed by the service control point for the call.

2. The method of claim 1 wherein:

at least one of the paths of the CPR logic diagram includes branches, the branches having functions to be performed by the service control point during the call.

3. The method of claim 2 further comprising:

estimating processing times required by the service control point for performing the functions associated with the branches; and associating the estimated processing times with the branches.

4. The method of claim 3 wherein:

monitoring includes monitoring the service control point to determine which branches the service control point follows during the call.

5. The method of claim 4 wherein:

determining includes determining the actual processing time as a function of the estimated processing times for the branches followed by the service control point for the call.

6. For an advanced intelligent network of a local exchange carrier, a method for measuring the usage of advanced intelligent network services by a competitive local exchange carrier having access to a service control point of the advanced intelligent network, the method comprising:

providing a call processing record (CPR) logic diagram for the service control point to follow for providing an advanced intelligent network service of the competitive local exchange carrier for a call, the CPR logic diagram including separate paths having functions to be performed by the service control point during the call;

estimating processing times required by the service control point for performing the functions associated with the paths of the CPR logic diagram;

associating the estimated processing times with respective paths of the CPR logic diagram;

monitoring the service control point to determine which path the service control point follows during the call; and determining the actual processing time expended by the service control point during the call as a function of the estimated processing time for the path followed by the service control point for the call.

7. The method of claim 6 further comprising:

associating with the CPR logic diagram a name tag identifying the competitive local exchange carrier for the call.

8. The method of claim 7 further comprising:

associating with the CPR logic diagram a service tag identifying the advanced intelligent network service provided for the call.

9. The method of claim 8 further comprising:

generating a billing record including the actual processing time expended by the service control point during the call, the name tag, and the service tag.

10. The method of claim 6 wherein:

at least one of the paths of the CPR logic diagram includes branches, the branches having functions to be performed by the service control point during the call.

11. The method of claim 10 further comprising:

estimating processing times required by the service control point for performing the functions associated with the branches; and associating the estimated processing times with the branches.

12. The method of claim 11 wherein:

monitoring includes monitoring the service control point to determine which branches the service control point follows during the call.

13. The method of claim 12 wherein:

determining includes determining the actual processing time as a function of the estimated processing times for the branches followed by the service control point for the call.

14. An advanced intelligent network comprising:

a service control point for performing functions during a call to provide an advanced intelligent network service for the call, wherein the service control point follows a call processing record (CPR) logic diagram during the call, the CPR logic diagram including separate paths having the functions to be performed by the service control point during the call, each of the paths associated with an estimated processing time required by the service control point for performing the function associated with the path; and a monitor for monitoring the service control point to determine which path the service control point follows during the call, the monitor further operable to determine the actual processing time expended by the service control point during the call as a function of the estimated processing time for the path followed by the service control point for the call.

\* \* \* \* \*